Dec. 8, 1953 D. L. SHERER 2,661,955
COMBINED BROADCAST SEEDER AND FERTILIZER SPREADER
Filed Feb. 1, 1952 3 Sheets-Sheet 1

INVENTOR.
DONALD L. SHERER
BY
ATTORNEYS

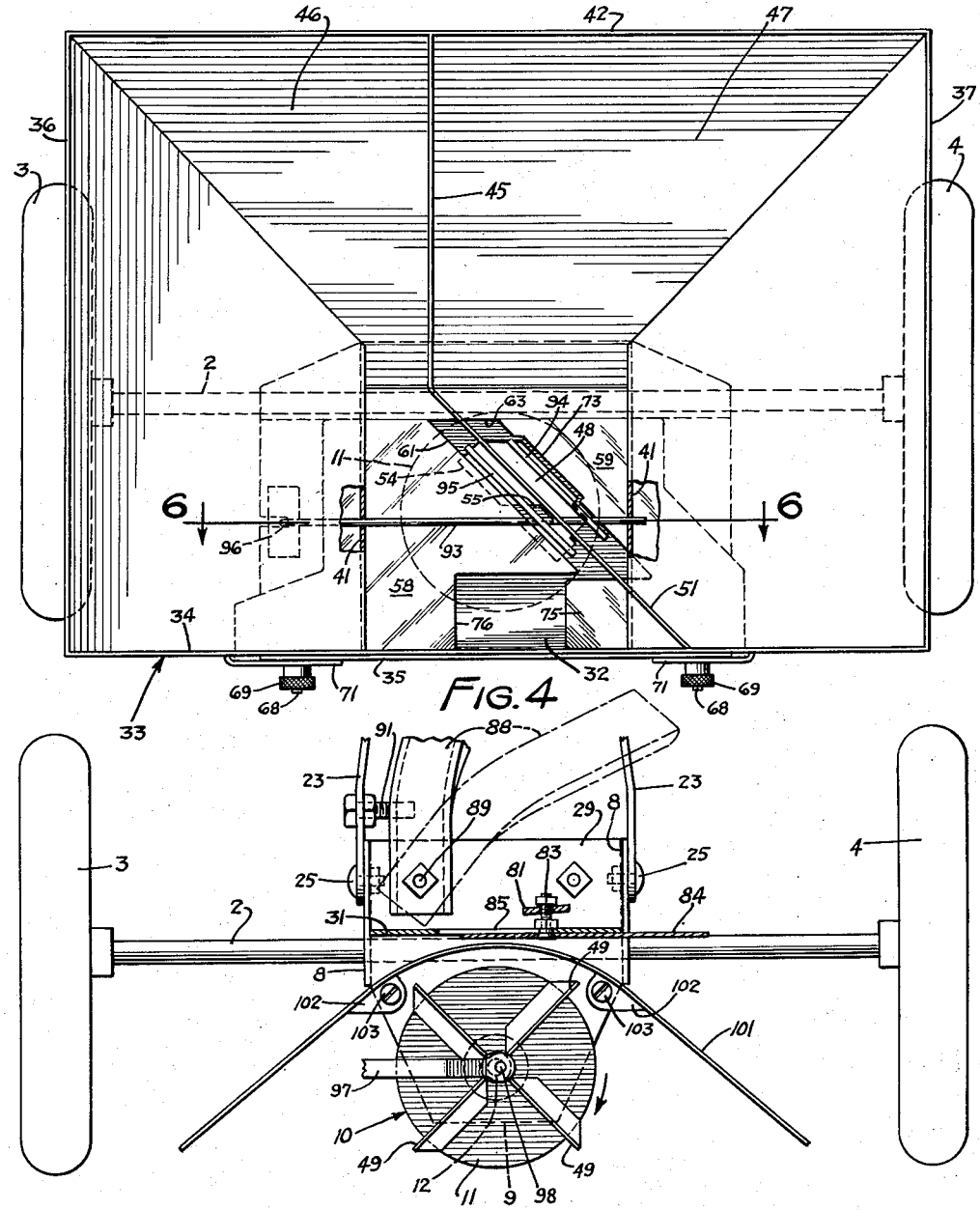

Dec. 8, 1953     D. L. SHERER     2,661,955
COMBINED BROADCAST SEEDER AND FERTILIZER SPREADER
Filed Feb. 1, 1952     3 Sheets-Sheet 3

INVENTOR.
DONALD L. SHERER
BY
ATTORNEYS

Patented Dec. 8, 1953

2,661,955

UNITED STATES PATENT OFFICE 2,661,955

COMBINED BROADCAST SEEDER AND FERTILIZER SPREADER

Donald L. Sherer, St. Louis Park, Minn.

Application February 1, 1952, Serial No. 269,403

6 Claims. (Cl. 275—8)

This invention relates to new and useful improvements in broadcast seeders for seeding lawn grass seed, and the like, and more particularly to an apparatus of this general type having means embodied therein whereby a second material as, for example, a commercial fertilizer, may be broadcast over the ground simultaneously with the grass seed.

There are now available on the market numerous devices for broadcasting lawn grass seed over a wide area, as when sowing a new lawn or reseeding an old one, but to the best of my knowledge none of these have proven entirely satisfactory for various reasons.

The present invention is the result of considerable research and experimental work in an attempt to provide a broadcast seeder of this general type wherein all of the objectionable features now inherent in apparatus of this general type have been substantially entirely eliminated, resulting in the provision of a seeder which will assure uniform distribution of the grass seed over a wide area, said apparatus also having means embodied therein for supporting a quantity of commercial fertilizer which may be uniformly distributed over the ground simultaneously with the broadcasting of the grass seed, valve means being provided for independently controlling and regulating the flows of grass seed and fertilizer to the distributor wheel of the apparatus, whereby the proportions of seed and fertilizer in the resultant mixture may be conveniently and accurately controlled to provide the most desirable results.

An important object of the present invention therefore is to provide a combined broadcast seeder and fertilizer distributor comprising dual hopper chambers for supporting quantities of bulk grass seed and fertilizer, and means being provided at the bottoms of said chambers for controlling the delivery of material therefrom onto a rotary distributor wheel which uniformly scatters the seed and fertilizer over the ground when the apparatus is moved thereover.

A further object of the invention is to provide a combined seeder and fertilizer spreader comprising dual hoppers, one for supporting grass seed, and the like, and the other being adapted to support a commercial fertilizer, or other material, which is to be intermixed with the grass seed when the latter is broadcast over the surface of the ground, and the bottoms of said hoppers having a common discharge opening provided with opposed slide valves adapted for movement independently of one another, thereby to vary the size of the discharge opening according to the proportions of grass seed and fertilizer desired in the mixture to be broadcast.

A further object is to provide a wheeled apparatus for uniformly broadcasting grass seed and commercial fertilizer, comprising a pair of hoppers provided with a bottom-forming plate having a discharge opening therein which is common to said hoppers, and a pair of plate elements being slidably mounted on said bottom-forming plate and having means for moving them towards or away from one another to vary the size of the discharge opening to control and regulate the flow of grass seed and fertilizer from said hoppers, and a main shut-off valve also being slidably supported on said bottom-forming plate for completely closing the discharge opening when the apparatus is not in use, or is being moved from one place to another.

Other objects of the invention reside in the movable means provided for agitating the material in the bottoms of the two hoppers to prevent it from bridging the discharge opening and interrupting flow therethrough; in the unique configuration of the discharging opening and in its angular disposition relative to the direction of travel of the apparatus; and in the simple and inexpensive construction of the apparatus, as a whole, whereby it may be manufactured in quantity production at low cost.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 4 is a top view of Figure 3, on an enlarged scale, with some of the parts omitted;

Figure 5 is a sectional plan view on the line 5—5 of Figure 3, showing the distributor wheel;

Figure 6:
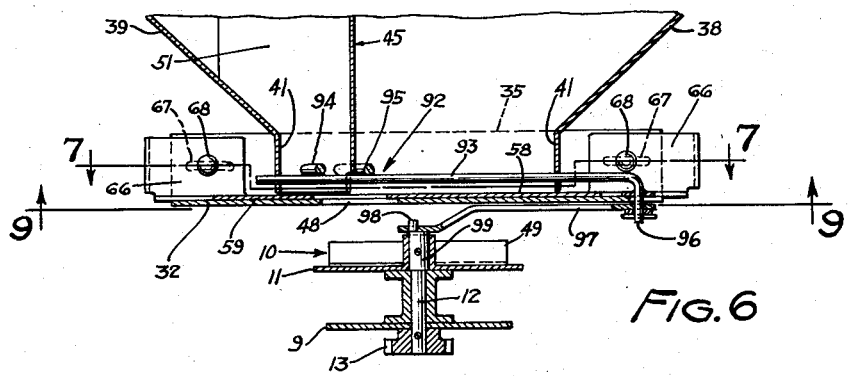
Figure 6 is a detail sectional view on the line 6—6 of Figure 4, with some of the parts omitted.

7—7 of Figure 6, with some of the parts omitted, showing the slidable plate valves for varying the size of the discharge opening.

Figure 8:
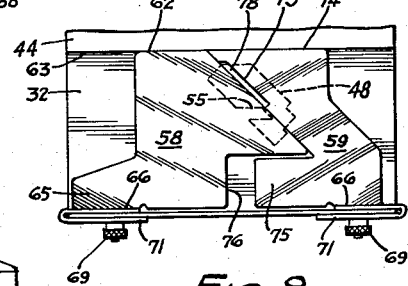

Figure 8 is a fragmentary view showing the plate valves in closed position; and

Figure 9:
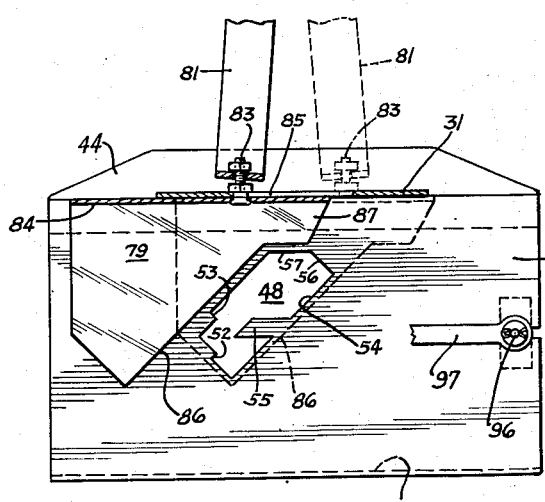

Figure 9 is a view substantially on the line 9—9 of Figure 6, showing the means for completely closing the discharge opening.

The novel apparatus herein disclosed is shown comprising an axle 2 having carrying wheels 3 and 4 mounted thereon. One of said wheels is non-rotatively secured to the axle by a pin 5, whereby the axle will rotate simultaneously with said wheel, when the device is moved over the ground. The other wheel may be freely rotatable on the axle to provide for turning movements of the apparatus, as is well-known.

A supporting frame, generally designated by the numeral 6, is shown provided with a horizontal plate portion 7 having downwardly extending spaced portions or legs 8—8 which are apertured to rotatably receive the axle 2. The horizontal plate portion 7 extends forwardly, as shown at 9 to provide a support for a rotary distributor wheel 10, secured to one end of an upright shaft 12 which extends downwardly through an aperture in the plate portion 9 and has a pinion 13 secured thereto. A suitable bearing sleeve 14 is secured to the plate portion 9 and upwardly spaces the distributor wheel 10 from the plate 9.

The pinion 13 meshes with a gear wheel 15 rotatively mounted on a stud 16 having its upper end suitably secured to the horizontal plate member 7 by such means as riveting or welding. A bevel pinion 17 is fixed to the central portion of the gear wheel 15 and meshes with a bevel gear 18 secured to the axle 2 by such means as a pin 19. Spacing sleeves 21 and 22 are mounted on the axle 2 between the bevel gear 18 and the depending portions 8—8 of the supporting frame 6, and serve to prevent relative axial movement of the axle 2 in its bearing portions 8—8 of the frame 6, as will be best understood by reference to Figure 2.

Figures 1, 2:
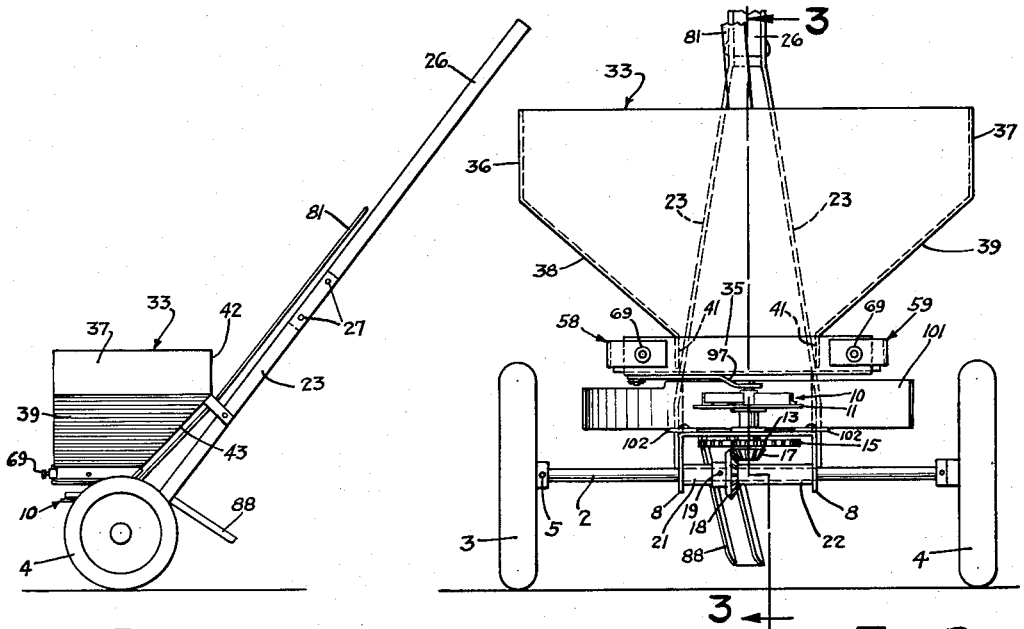
Figure 1 is a side view of the novel combined broadcast seeder and fertilizer spreader herein disclosed.
Figure 2 is a front view of the apparatus.

A pair of metallic handle members 23 are shown having their lower ends fixed to the depending portions 8—8 of the supporting frame 6 by such means as bolts 25. An operating handle 26, preferably of wood, has its lower end secured to the upper ends of the strap-like members 23 by such means as rivets or bolts 27, as indicated in Figure 1.

Secured to the upper horizontal plate portion 7 of the U-shaped frame 6 is a secondary frame member, generally designated by the numeral 28. The member 28 has a horizontal base portion 29 fixedly secured to the horizontal plate portion 7 of the frame 6 by such means as welding, whereby the member 28 cooperates with the lower frame 6 to provide a composite supporting frame for the operating parts of the apparatus. The frame member 28 is shown having an upright wall portion 31 terminating at its upper end in a forwardly extending horizontal plate portion 32, which constitutes the bottom wall of an enlarged hopper, generally designated by the numeral 33.

Figure 3:
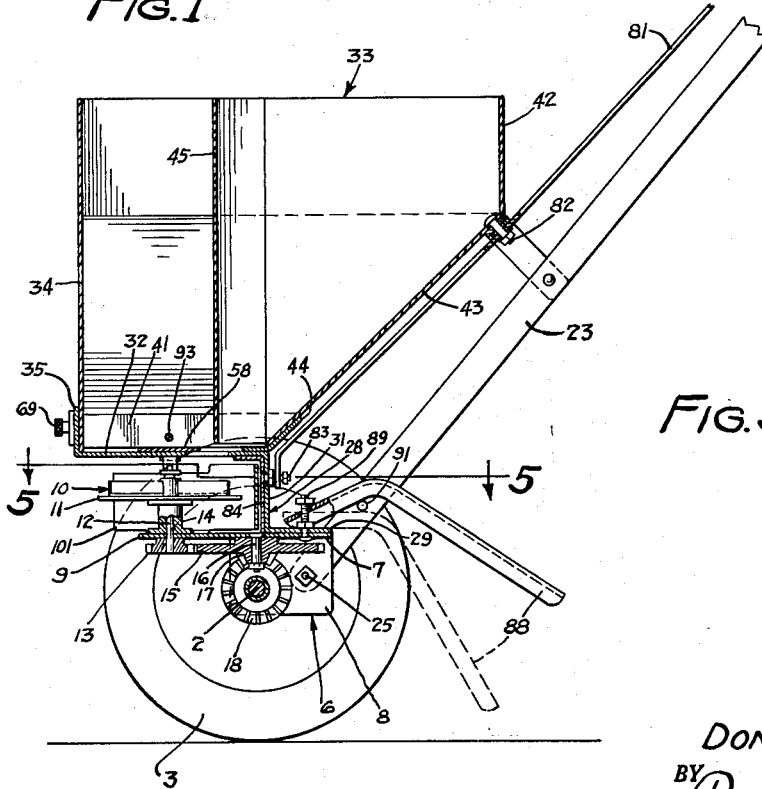
Figure 3 is a vertical sectional view substantially on the line 3—3 of Figure 2.

The hopper 33 is shown comprising a front wall 34 having its lower marginal edge secured to an upright flange 35 provided at the forward end of the upper horizontal plate portion 32 of the frame member 28, as best illustrated in Figure 3. The hopper further comprises opposed side walls 36 and 37 which have inclined wall portions 38 and 39, respectively, which terminate at their lower ends in vertical wall portions 41. The rear wall 42 of the hopper 33 has its lower portion 43 extending downwardly and forwardly, as shown in Figure 3, and its lower marginal edge portion is secured to the upper end of a bracket 44, the lower end of which is fixedly secured to the horizontal plate portion 32 by such means as welding.

Another important feature of the present invention resides in the novel construction of the hopper 33, whereby two different materials such as grass seed and commercial fertilizer, or two other materials, may be supported therein and simultaneously discharged therefrom onto the rotary distributor wheel 10 for uniform broadcasting over a wide area. To support two different materials in the hopper, a partition 45 is secured therein and extends downwardly from the top edges of the hopper walls to substantially the plate 32 which forms the bottom wall of the hopper. The partition 45 thus divides the hopper into two compartments 46 and 47.

The bottom plate 32 of the hopper has a discharge opening 48 therein which is preferably shaped as best illustrated in Figure 9, in order to obtain uniform distribution of the seed and fertilizer, or other material to be broadcast by the apparatus. The discharge opening 48, it will be noted by reference to Figures 4 and 7, is disposed directly above the circular disk 11 of the distributor wheel 10, whereby the materials discharging from the hopper chambers 46 and 47 are precipitated onto said distributor to be outwardly broadcast by the action of the blades 49 of the rotor 10.

Figure 7:
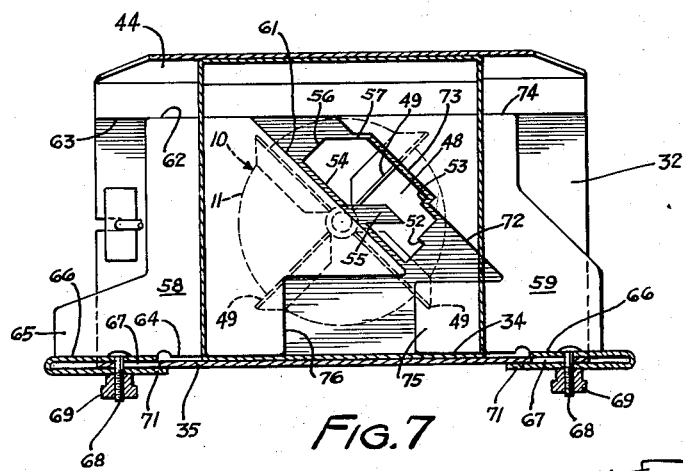
Figure 7 is a sectional plan view on the line

To further assure uniform distribution of the material over the full width of the area to be covered by the apparatus, the discharge opening 48 is disposed at an angle of approximately forty-five degrees to the axis of the axle 2, as clearly illustrated in Figures 4 and 7. The forward portion 51 of the partition 45 in the hopper is therefore disposed at a similar angle and has its lower edge intersecting the discharge opening lengthwise thereof, as clearly illustrated in Figure 4.

Another feature of the invention resides in the unique configuration of the discharge opening 48 which, it will be noted by reference to Figures 7 and 9, is quite irregular in form. The forwardly directed end wall of the discharge opening is stepped, as shown at 52 and 53, and its forwardly directed side wall 54 is formed with an inwardly extending projection 55 which acts to partially obstruct material flow onto the central portion of the distributor wheel 10. It will be further noted that the rear end wall 56 of the discharge opening has an inclined wall portion 57 which is preferably disposed in substantially parallel relation to the opposed side walls of the projection 55, as may be noted by reference to Figure 7.

By thus shaping the discharge opening 48, all of its walls are disposed well within the peripheral edge of the circular disk 11 of the distributor wheel 10, thereby assuring that all material passing through the discharge opening, even though when wide open, is precipitated directly onto the disk 11. The stepped front end wall of the discharge opening (52—53) cooperates with the projection 55 to so deliver the seed and fertilizer onto the distributor wheel 10 that the distributor will broadcast the mixture of seed and fertilizer over the ground in a very uniform pattern, a highly desirable attribute in an apparatus of this type.

To control and regulate the flow of material from the hopper chambers 46 and 47 onto the distributor wheel, a pair of slide valves, generally designated by the numerals 58 and 59, are slidably supported on the plate 32 forming the bottom wall of the hoppers, as will be understood by reference to Figures 7, 8 and 9. The valve member 58 has its inwardly facing edge 61 disposed in substantially parallel relation to the wall 54 of the discharge opening 48. The rear edge 62 of valve 58 is guidingly supported by the edge 63 of the bracket 44, and its front edge 64 is similarly guided by the lowermost edge portion of the front wall 34 of the hopper. The slide 58 further has an outwardly extending portion 65 shown having an upright portion 66 which is bent upon itself, as shown in Figure 7, to embrace the upright flange 35 of the plate member 32, as will be understood by reference to Figures 3, 6, and 7. The flange 35 has a horizontal slot 67 therein adapted to receive a clamping bolt 68 having a knurled nut 69 received in threaded engagement therewith whereby the parts 66 and 71 may be manipulated to clampingly engage the flange 35 and thereby secure the slide 58 in adjusted position relative to the discharge opening 48.

The slide 59 has an inclined edge 72, shown provided with an elongated notch 73 disposed in parallel relation to the adjacent side wall of the discharge opening 48. The rear edge 74 of slide 59 is guidingly supported by the adjacent edge 63 of the bracket 44, and its forward edge is guidingly supported by the lower edge of the front wall 34 of the hopper, in a manner similar to the slide 58. Slide 59 is provided with a clamping device 69 and 71 similar to slide 58, and the parts thereof are therefore indicated by like numerals. To adequately support the slide 59 between its guides 34 and 63, said slide has a lateral extension 75 which is receivable in a cutaway portion 76 of the slide 58, when the slides are in closing positions as shown in Figure 8.

When thus positioned, it will be noted that the discharge opening is not completely closed, as the notch or recess 73 in the edge 72 of slide 59 does not abuttingly engage the adjacent edge portion of slide 58. The elongated discharge opening 78 provided by the notch 73, when the slides are in closed positions, as shown in Figure 8, serves to provide a restricted discharge opening for small seeds, when it is desired to broadcast a very limited quantity of seed over the ground surface as, for example, when reseeding an old established lawn.

A main shut-off valve, generally designated by the numeral 79, is slidably supported on the bottom of the horizontal plate 32 and is adapted to be moved from its open position, shown in full lines in Figure 9, to its closed position, indicated in dotted lines in Figure 9, by manipulation of an operating handle 81 pivoted at 82 to the rear upper portion of the hopper 33. The lower end of handle 81 is movably connected to one end of a stud 83, the opposite end of which is anchored to the vertically disposed leg 84 of the slide 79. The stud 83 is slidable in a horizontal slot 85 provided in the upright wall portion 31 of the main supporting frame, as will be understood by reference to Figures 3, 5 and 9.

The main shut-off valve 79 has an inclined edge 86 which is substantially parallel to the adjacent edge of the discharge opening 48. In addition, the slide 79 has a lateral off-set portion 87 disposed adjacent to the upright wall 31 of the main frame to provide an adequate guide for the valve plate 79, as will be understood. By referring to Figure 3, it will be noted that the upright leg 84 of the slide valve 79 extends from the upper horizontal plate portion 32 of the main frame downwardly to the lower horizontal plate portion 9 thereof.

Means is provided for supporting the apparatus in loading position and is shown comprising a leg 88 having its upper end pivotally connected to a stud 89 secured to the machine frame. The leg 88 is preferably shaped as shown in Figure 3, and may be of channel cross-section. A stud 91 is secured to one of the handle members 23 of the apparatus and extends outwardly therefrom whereby the leg 88 may be swung under said stud, as shown in dotted line in Figure 3, when it is desired to support the apparatus in loading position. When the apparatus is in use the leg 88 is swung laterally to one side, as indicated in dotted lines in Figure 5, and then back to the full line position over the stud 91 whereby the leg may be supported in an elevated, out-of-the-way position during operation of the apparatus, as will be clearly understood by reference to Figure 3.

To prevent bridging of the material over the discharge opening 48, and to assure a constant flow of material from the hoppers onto the distributor wheel 10, means is provided for constantly agitating the material directly over the discharge opening 48, when the machine is in operation, and is shown comprising an agitator, generally designated by the numeral 92. In the application drawings, particularly Figures 4 and 6, the agitator is shown comprising a rod 93 slidably supported in suitable guide openings provided in the side walls 44 of the hopper. Cross rods 94 and 95 are secured to the rod 93 by such means as welding, and are preferably angularly disposed thereon whereby they are substantially parallel to the opposed side edges or walls of the discharge opening.

The rod 93 has a downwardly extending end portion 96 to which one end of a pitman 97 is connected, as illustrated in Figures 6 and 9. The opposite end of the pitman is connected to a crank pin 98 provided on the upper end of the enlarged portion 99 of the upright shaft 12, whereby when the distributor wheel 10 is rotated, the pitman 97 will impart a reciprocal movement to the agitator 92, whereby the material cannot bridge the discharge opening, as will be readily understood. Obviously, the agitator 92 may be otherwise constructed, if desired, without departing from the scope of the invention.

Means is also provided for preventing the material from being thrown rearwardly or against the carrying wheels 3 and 4, and is shown comprising an arcuately formed member or guard 101, provided with lugs 102 adapted to be seated upon the forwardly extending plate portion 9 of the main supporting frame and secured thereto by bolts 103, as shown in Figure 5.

When the apparatus is to be utilized for broadcasting a mixture of grass seed and fertilizer over a lawn or other area, a quantity of bulk grass seed is delivered into the hopper chamber 46, and a commercial fertilizer is delivered into hopper 47, it being understood that the main shut-off valve 79 has previously been moved into closing position, as indicated in dotted lines in Figure 9. Such closing of the main shut-off valve is accomplished by the manipulation of the lever 81, conveniently positioned over the operating handle 26.

The apparatus may then be wheeled to the location where the material is to be broadcast, after which the operator adjusts the slide valves 58 and 59 to provide the desired feed or flow of the two materials from the hoppers onto the distributor wheel 10. The clamping elements 71 may be provided with suitable indicia, not shown, as, for example, 0—1—2—3—4, representing different positions of the valves 58 and 59 over the discharge opening, whereby the operator may quickly adjust the valves to cause predetermined quantities of grass seed and fertilizer to be delivered onto the distributor to provide the desired mixture to be broadcast. When the slide valves 58 and 59 are positioned at their zero marking they will be in their closed positions shown in Figure 8, wherein it will be noted that the restricted elongated opening 78 resulting from the notch 73 may be open, should the main shut-off valve 86 be in its open position as shown in Figure 9. The two valves are independently adjustable so that the proportions of grass seed and fertilizer delivered onto the distributor wheel 10 may be accurately controlled and regulated to provide the desired results.

The elongated restricted opening 78 has been found particularly useful when it is desired to broadcast a very light quantity or sprinkling of grass seed, such as when replanting an established lawn which may require a light seeding to bring it up to full growth. The unique configuration of the discharge opening, including the projection 55, is essential in the operation of the apparatus in order to assure a uniform pattern of seed and fertilizer over the full area covered by the broadcast material.

The apparatus is extremely simple and inexpensive in construction, as most of the parts thereof may be constructed of metal punchings which may be inexpensively blanked from stock sheet metal with conventional dies at extremely low cost, as will readily be understood.

While I have herein described the apparatus as being utilized more particularly for broadcasting grass seed and fertilizer, it is to be understood that it may be utilized for broadcasting various other materials without departing from the scope of the invention.

The apparatus may also be utilized for broadcasting a single material over the ground as, for example, fertilizer. When so used a quantity of bulk fertilizer may be introduced in both hoppers, and the valve plates 58 and 59 adjusted to cause the distributor wheel to uniformly broadcast a predetermined quantity of fertilizer over a given size area as, for instance, one pound of fertilizer to each one thousand square feet of lawn surface. The quantity of fertilizer per each one thousand square feet of lawn surface may, of course, be readily varied by adjustment of valve plates 58 and 59, as hereinbefore stated.

I claim as my invention:

1. In a broadcast distributor, a hopper having a bottom wall, a partition in the hopper extending upwardly from said bottom wall to the upper portion of the hopper and dividing the hopper into seed and fertilizer chambers, said bottom wall having an elongated main discharge opening therein located directly beneath said partition with its longitudinal axis disposed in substantially parallel relation to the bottom edge of said partition whereby a portion of said opening is in direct communication with the seed chamber and the remaining portion with the fertilizer chamber, independently operable slide valves for regulating the rate of feed and the relative proportions of seed and fertilizer delivered onto a broadcast distributor positioned beneath the hopper, said main discharge opening having its longitudinal axis disposed at an angle to the direction of travel of the apparatus, when in use, and having means therein for intercepting a portion of the material flowing therethrough onto the distributor, thereby to effect uniform distribution of the broadcast material over the ground.

2. In a broadcast distributor, a hopper having a bottom wall, a partition in the hopper extending upwardly from said bottom wall to the upper portion of the hopper and dividing the hopper into seed and fertilizer chambers, said bottom wall having an elongated main discharge opening therein located directly beneath said partition with its longitudinal axis disposed in substantially parallel relation to the bottom edge of said partition, whereby a portion of said opening is in direct communication with the seed chamber and the remaining portion with the fertilizer chamber, independently operable slide valves for regulating the rate of feed and the relative proportions of seed and fertilizer delivered onto a broadcast distributor positioned beneath the hopper, said main discharge opening being laterally offset from the axis of said distributor, and said bottom wall having an elongated fixed element extending into said opening for intercepting a portion of the material flowing therethrough onto the distributor, thereby to effect uniform and solid coverage of the broadcast materials over the surface of the ground.

3. A broadcast distributor according to claim 2, wherein said elongated fixed element has its longitudinal axis disposed at substantially right angles to the direction of travel of the apparatus, when in use.

4. A broadcast distributor according to claim 3, wherein said elongated fixed element has its outer free end terminating adjacent to the lower edge of said partition, whereby the chamber disposed directly over said element has, in effect, two spaced discharge openings, thereby to assure uniform coverage and distribution of the broadcast materials over the ground surface.

5. A broadcast distributor according to claim 2, wherein a main shut-off valve is provided for interrupting flow of material from said chambers onto the distributor without disturbing the preset positions of said slide valves.

6. In an apparatus of the class described, a wheel supported frame, a hopper on said frame provided with a bottom wall having an elongated main discharge opening therein, a partition dividing the interior of said hopper into two separate chambers adapted to contain different materials, the bottom edge of said partition being disposed directly over said main discharge opening whereby said opening provides, in effect, dual discharge openings, one for each of said chambers, slide valves for regulating the rate of feed and the relative proportion of each material onto a broadcast distributor wheel positioned beneath said discharge opening, said elongated main discharge opening having its longitudinal axis disposed at an angle to the direction of travel of the apparatus, when in use, and having its larger portion disposed rearwardly of the axis of said distributor wheel, said bottom wall being formed with an elongated element which projects into said main discharge opening with its free end terminating adjacent to the bottom edge of said partition whereby said element divides the flow of material from one of said chambers onto the distributor wheel into two separate streams, whereas the material discharging from the other of said chambers will flow in a single stream onto the distributor, thereby to effect relatively greater uniformity and coverage of the broadcast material over the surface of the ground, and a single shut-off valve for interrupting the flow of materials from said chambers when the apparatus is at rest.

DONALD L. SHERER.

References Cited in the file of this patent

UNITED STATES PATENTS

| Number | Name | Date |
|---|---|---|
| 1,205,431 | Burns | Nov. 21, 1916 |
| 1,407,333 | McConnell | Feb. 21, 1922 |
| 1,912,172 | Bailey | May 30, 1933 |
| 2,134,612 | Jennings | Oct. 25, 1938 |
| 2,334,376 | Bauer | Nov. 16, 1943 |
| 2,515,269 | Shaw | July 18, 1950 |
| 2,537,913 | Rimple | Jan. 9, 1951 |
| 2,547,143 | Speicher | Apr. 3, 1951 |
| 2,553,403 | Cory | May 15, 1951 |
| 2,565,427 | Herd | Aug. 21, 1951 |